Oct. 19, 1954 D. D. HOLMES 2,692,333

WAVE SHAPING CIRCUIT

Filed Aug. 2, 1951

INVENTOR
David D. Holmes
BY
ATTORNEY

Patented Oct. 19, 1954

2,692,333

UNITED STATES PATENT OFFICE 2,692,333

WAVE SHAPING CIRCUIT

David D. Holmes, New Brunswick, N. J., assignor to Radio Corporation of America, a corporation of Delaware Application August 2, 1951, Serial No. 239,917

1 Claim. (Cl. 250—27)

This invention relates to electrical wave shaping circuits, and more particularly to wave shaping circuits designed to compress one part of a signal and to expand another part of that signal.

In the image reproducing arts, it is often necessary to reproduce an image of a scene by a medium having a smaller range of light values than the range of light values in the original scene. For example, in both black-and-white and color printing, the transparencies derived by the photographic process ordinarily have a ratio of maximum to minimum light transmission on the order of 200:1 whereas the paper on which the image is to be reproduced may have a corresponding ratio of only 20:1. A similar situation exists in television owing at least in part to the limitations of the reproducing kinescope used in receivers.

Unless remedial steps are taken, small variations in intensity of the original scene that take place at light levels beyond the range of the reproducing medium are lost. For example, if a person's face in the transparency or in an actual scene reflects more light than the reproducing means can handle, the face appears in the reproduced image as being pasty white. All the fine shadings representative of delicate facial contours are lost. If a neutral filter is employed to limit the maximum amount of light applied to the reproducing medium, fine shading in the dark portion of the scene may then be below the minimum light capacity of the reproducing means.

Accordingly, it has been suggested that the linearity of the reproducing system be altered so that all intensity variations, whether they are in a light portion of a scene or in a dark portion, may be reproduced in some degree. The nature of this non-linearity is normally such that a given change in light input to the reproducing system as it is derived from a dark area produces a greater change in output of the reproducing medium than a similar change in the light portions of the scene. Thus, the light areas are compressed in intensity and the dark areas are expanded in intensity. This particular type of non-linearity is selected because the eye's response characteristics are such that small variations in the output of the reproducing medium in light areas appear to be comparable to larger changes in dark areas. The degree of non-linearity of the reproducing system is generally termed the "gamma" of the system, and may be defined as the power to which the light input must be raised to give the output. Thus, $L_o = KL_i^{\gamma}$ when $L_i$ is the light input, $L_o$ is the light output, $\gamma$ is the "gamma," and K is a constant.

An object of this invention is to provide a circuit that will alter the linearity of a signal transmission path.

Another object of the invention is to provide a circuit that will compress one part of an input signal and expand another part of that signal.

According to the present invention, the linearity of a signal is altered by providing an electrical control network having two signal paths, one of which has a substantially linear signal transfer characteristic and one of which has substantially an exponential or power law signal transfer characteristic, i. e., has an output voltage which is substantially a function of some power of the input voltage. The output signals of both paths are added in reverse phase (i. e. subtracted) and the resulting transfer characteristic approximates a "root" characteristic, i. e. the output voltage is approximately a function of some root of the input voltage. The resulting transfer characteristic gives the desired gamma correction.

Other and incidental objects of the present invention will be apparent to those skilled in the art from a reading of the following specification and an inspection of the accompanying drawing in which.

Figures 1, 2, 3:
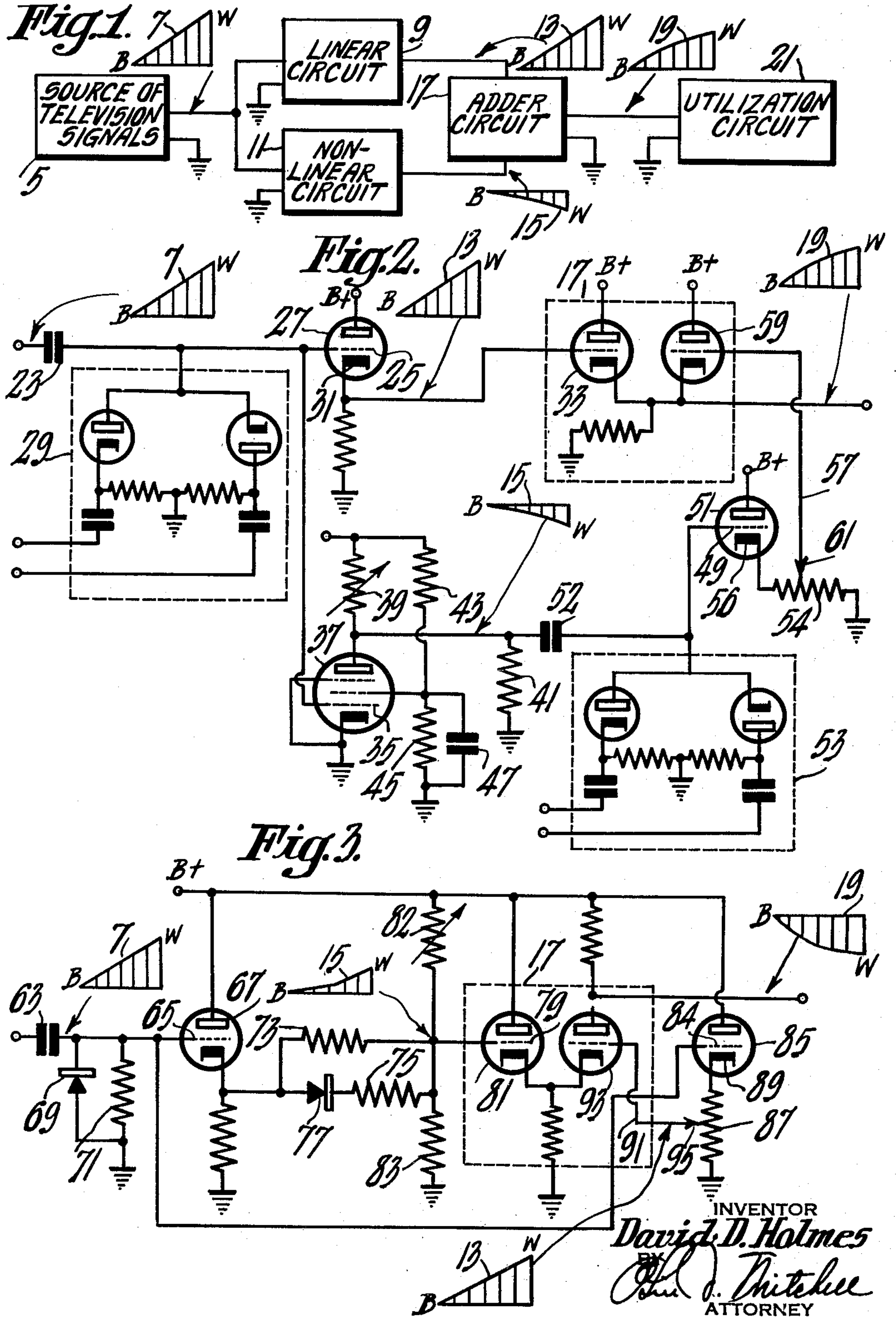
Figure 1 is a block diagram of apparatus embodying the present invention.
Figure 2 shows by circuit diagram an embodiment of the present invention.
Figure 3 shows by circuit diagram another embodiment of the present invention.

Referring now to Figure 1 there is shown a source of signals 5, which by way of example has been shown as a source of television signals. A signal 7, varying linearly from black (B) to white (W), is shown at the output of the signal source 5. The signal 7 is fed to a linear circuit 9 having a linear transfer characteristic. The signal 7 is also fed to a non-linear circuit 11 having an exponential transfer characteristic. The output signals of circuits 9 and 11 are shown at 13 and 15 respectively. Signals 13 and 15 are then fed into an added circuit 17 whose output 19 is the sum of signals 13 and 15. The output signal 19 is then fed into a utilization circuit 21.

The linearity of signal 7 has been altered as can be seen from signal 19. Gamma correction has thus been introduced, the black portions of the signal having been expanded with respect to the white portions, and the white portions compressed with respect to the black portions.

It can be seen that the signal 7 has gone through circuit 9 to become signal 13 without having undergone a phase shift. On the other hand signal 7, which emerges as signal 15 from circuit 11, has undergone a 180° phase shift. The output 19 of the adder circuit 17 may be considered as the sum of signals 13 and 15. It may also be considered as the difference of two signals, since the two signals are 180 degrees out of phase with respect to one another when they are added.

As used in this specification, the term "adder circuit" means a circuit capable of doing an algebraic addition, and as such comprises circuits capable of adding two signals as well as circuits capable of subtracting two signals. Such circuits are well known in the art, and are discussed, for example, in Chapter 18 of "Waveforms," vol 19 of the M. I. T. Radiation Laboratory Series, McGraw-Hill, 1949.

Referring now to Figure 2, a signal 7 is applied through coupling capacitor 23 to the input electrode 25 of an amplifier tube 27 which has a linear transfer characteristic. A clamp circuit 29 is shown connected to the electrode 25 in order to preserve the direct current level of signal 7. The particular clamp circuit shown is known in the art and is discussed in an article entitled "Television D. C. component" by K. R. Wendt in the RCA Review for March 1948. The amplifier tube 27 is connected as a cathode follower, and an output signal 13, taken from the cathode 31 of amplifier tube 27, is applied to the input electrode of tube 33 of the adder circuit 17. The signal 7 is also applied to the input electrode 35 of an amplifier tube 37 which has an exponential transfer characteristic. Variable resistor 39 and fixed resistor 41 form a voltage divider designed to vary the plate potential of tube 37. Resistors 43 and 45, as well as capacitor 47, provide the screen grid bias of tube 37. The output signal 15 of tube 37 is applied to the input electrode 49 of a tube 51 through a capacitor 52. A clamp circuit 53, similar to clamp circuit 29, is connected to the input electrode 49 of tube 51. Tube 51 is connected as a cathode follower: its output signal is taken from a resistance 54 connected between its cathode 56 and ground. The output signal of tube 51 is applied by means of lead 57 to the input electrode of tube 59 of the adder circuit 17, the amount of signal thus applied being controlled by means of sliding contact 61. The output signal of adder circuit 17 is shown as signal 19.

The shape of signal 15 may be varied somewhat by changing the value of resistor 39, while the amount of signal 15 applied to the adder 17 may be changed by moving the sliding contact 61. Thus the shape of the output signal 19, representing the gamma correction, can be varied.

Referring now to Figure 3, signal 7 is applied through coupling capacitor 63 to the input electrode 65 of an amplifier tube 67 which has a linear transfer characteristic. A clamp circuit comprising rectifier 69 and resistor 71 is shown connected to the input electrode 65 of tube 67. Tube 67 is connected as a cathode follower and its output is fed through circuit having a non-linear circuit characteristic, and comprising resistors 73 and 75 and rectifier 77 to the input electrode 79 of tube 81 of adder circuit 17. The input electrode 79 of tube 81 is connected to a source of positive potential through a variable resistor 82 and to ground through a fixed resistor 83. The signal 7 is also applied to the input electrode 84 of an amplifier tube 85 which has a linear transfer characteristic. Tube 85 is connected as a cathode follower; its output is taken from a resistor 87 connected between its cathode 89 and ground. The output signal of tube 85 is applied by means of lead 91 to the input electrode of tube 93 of the adder circuit 17. The amount of signal thus applied being controlled by means of sliding contact 95. The output signal of adder circuit 17 is shown as signal 19.

The shape of signal 15 may be altered by changing the value of resistor 79, while the amount of signal 13 applied to the adder circuit 17 may be changed by moving the sliding contact 95. Thus the shape of the output signal 19, representing the gamma correction, may be varied.

What is claimed is:

A wave shaping circuit for altering the gamma of television picture signals, said circuit comprising a first amplifier having input and output terminals and having a steady state signal amplitude transfer characteristic which is substantially linear, a second amplifier having input and output terminals and having a steady state signal amplitude transfer characteristic such that its output voltage is substantially a function of some power greater than unity of its input voltage, means for varying the transfer characteristic of said second amplifier such as to vary the curvature of said characteristic, means connecting together the input terminals of said first and second amplifiers, means to apply television picture signals with their direct current component preserved to the input terminals of both said first and second amplifier, means associated with each of said first and second amplifiers to preserve the D. C. component of the television picture signals going therethrough, an adder circuit, a utilization circuit connected to said adder, and means for applying signals from the output terminals of said first and second amplifiers with substantially opposite polarity to said adder circuit such that the output signal of said adder representing the difference between the television picture signals which have gone through both said amplifiers.

References Cited in the file of this patent

UNITED STATES PATENTS

| Number | Name | Date |
|---|---|---|
| 1,315,539 | Carson | Sept. 9, 1919 |
| 2,118,626 | Smith | May 24, 1938 |
| 2,271,876 | Seeley | Feb. 3, 1942 |
| 2,299,945 | Wendt | Oct. 27, 1942 |
| 2,496,723 | Hipple, Jr. | Feb. 7, 1950 |
| 2,509,987 | Newman | May 30, 1950 |
| 2,552,588 | Reeves | May 15, 1951 |